(12) United States Patent
Brown et al.

(10) Patent No.: US 9,715,110 B1
(45) Date of Patent: Jul. 25, 2017

(54) AUTOMOTIVE HEAD UP DISPLAY (HUD)

(71) Applicants: Robert D. Brown, Lake Oswego, OR (US); Christopher A Keith, Wilsonville, OR (US); Eric P. Stratton, Portland, OR (US); James H. Stanley, Palo Alto, CA (US); Ming Yu, Beaverton, OR (US)

(72) Inventors: Robert D. Brown, Lake Oswego, OR (US); Christopher A Keith, Wilsonville, OR (US); Eric P. Stratton, Portland, OR (US); James H. Stanley, Palo Alto, CA (US); Ming Yu, Beaverton, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/820,237

(22) Filed: Aug. 6, 2015

(51) Int. Cl.
*G02B 27/01* (2006.01)

(52) U.S. Cl.
CPC ......... *G02B 27/0101* (2013.01); *G02B 27/01* (2013.01); *G02B 27/0103* (2013.01); *G02B 2027/0141* (2013.01)

(58) Field of Classification Search
CPC  G02B 27/01; G02B 27/0101; G02B 27/0103; G02B 2027/0141; G02B 2027/0112
USPC ........................... 359/13, 629, 630, 632, 633
See application file for complete search history.

(56) References Cited

U.S. PATENT DOCUMENTS

| | | |
|---|---|---|
| 2,141,884 A | 12/1938 | Sonnefeld |
| 3,620,601 A | 11/1971 | Waghorn |
| 3,851,303 A | 11/1974 | Muller |
| 3,885,095 A | 5/1975 | Wolfson et al. |
| 3,940,204 A | 2/1976 | Withrington |
| 4,082,432 A | 4/1978 | Kirschner |
| 4,099,841 A | 7/1978 | Ellis |
| 4,178,074 A | 12/1979 | Heller |
| 4,218,111 A | 8/1980 | Withrington et al. |
| 4,232,943 A | 11/1980 | Rogers |
| 4,309,070 A | 1/1982 | St. Leger Searle |
| 4,647,967 A | 3/1987 | Kirschner et al. |
| 4,711,512 A | 12/1987 | Upatnieks |

(Continued)

FOREIGN PATENT DOCUMENTS

| | | |
|---|---|---|
| CN | 101881936 A | 11/2010 |
| DE | 10 2006 003 785 | 7/2007 |

(Continued)

OTHER PUBLICATIONS

U.S. Appl. No. 13/250,858, filed Sep. 30, 2011, Brown et al.

(Continued)

*Primary Examiner* — William R Alexander
(74) *Attorney, Agent, or Firm* — Donna P. Suchy; Daniel M. Barbieri

(57) ABSTRACT

A head up display can be used in an automotive application and provides information for viewing above a glareshield or dashboard. The head up display includes a waveguide combiner and a compact projector. The waveguide combiner is at least partially disposed above the glareshield or dashboard and can provide dual axis pupil expansion. The waveguide combiner can present conformal or near conformal information and vehicle instrumentation information.

20 Claims, 4 Drawing Sheets

(56) References Cited

U.S. PATENT DOCUMENTS

| | | |
|---|---|---|
| 4,714,320 A | 12/1987 | Banbury |
| 4,743,083 A | 5/1988 | Schimpe |
| 4,749,256 A | 6/1988 | Bell et al. |
| 4,775,218 A | 10/1988 | Wood et al. |
| 4,854,688 A | 8/1989 | Hayford et al. |
| 4,928,301 A | 5/1990 | Smoot |
| 4,946,245 A | 8/1990 | Chamberlin et al. |
| 5,007,711 A | 4/1991 | Wood et al. |
| 5,035,734 A | 7/1991 | Honkanen et al. |
| 5,076,664 A | 12/1991 | Migozzi |
| 5,079,416 A | 1/1992 | Filipovich |
| 5,117,285 A | 5/1992 | Nelson et al. |
| 5,124,821 A | 6/1992 | Antier et al. |
| 5,148,302 A | 9/1992 | Nagano et al. |
| 5,151,958 A | 9/1992 | Honkanen |
| 5,153,751 A | 10/1992 | Ishikawa et al. |
| 5,159,445 A | 10/1992 | Gitlin et al. |
| 5,160,523 A | 11/1992 | Honkanen et al. |
| 5,183,545 A | 2/1993 | Branca et al. |
| 5,187,597 A | 2/1993 | Kato et al. |
| 5,210,624 A | 5/1993 | Matsumoto et al. |
| 5,218,360 A | 6/1993 | Goetz et al. |
| 5,243,413 A | 9/1993 | Gitlin et al. |
| 5,289,315 A | 2/1994 | Makita et al. |
| 5,295,208 A | 3/1994 | Caulfield et al. |
| 5,303,085 A | 4/1994 | Rallison |
| 5,317,405 A | 5/1994 | Kuriki et al. |
| 5,341,230 A | 8/1994 | Smith |
| 5,351,151 A | 9/1994 | Levy |
| 5,359,362 A | 10/1994 | Lewis et al. |
| 5,363,220 A | 11/1994 | Kuwayama et al. |
| 5,369,511 A | 11/1994 | Amos |
| 5,400,069 A | 3/1995 | Braun et al. |
| 5,408,346 A | 4/1995 | Trissel et al. |
| 5,418,584 A | 5/1995 | Larson |
| 5,438,357 A | 8/1995 | McNelley |
| 5,455,693 A | 10/1995 | Wreede et al. |
| 5,471,326 A | 11/1995 | Hall et al. |
| 5,473,222 A | 12/1995 | Thoeny et al. |
| 5,496,621 A | 3/1996 | Makita et al. |
| 5,500,671 A | 3/1996 | Andersson et al. |
| 5,510,913 A | 4/1996 | Hashimoto et al. |
| 5,515,184 A | 5/1996 | Caulfield et al. |
| 5,524,272 A | 6/1996 | Podowski et al. |
| 5,532,736 A | 7/1996 | Kuriki et al. |
| 5,537,232 A | 7/1996 | Biles |
| 5,572,248 A | 11/1996 | Allen et al. |
| 5,579,026 A | 11/1996 | Tabata |
| 5,604,611 A | 2/1997 | Saburi et al. |
| 5,606,433 A | 2/1997 | Yin et al. |
| 5,612,733 A | 3/1997 | Flohr |
| 5,612,734 A | 3/1997 | Nelson et al. |
| 5,619,254 A | 4/1997 | McNelley |
| 5,629,259 A | 5/1997 | Akada et al. |
| 5,631,107 A | 5/1997 | Tarumi et al. |
| 5,633,100 A | 5/1997 | Mickish et al. |
| 5,646,785 A | 7/1997 | Gilboa et al. |
| 5,648,857 A | 7/1997 | Ando et al. |
| 5,661,577 A | 8/1997 | Jenkins et al. |
| 5,661,603 A | 8/1997 | Hanano et al. |
| 5,665,494 A | 9/1997 | Kawabata et al. |
| 5,668,907 A | 9/1997 | Veligdan |
| 5,682,255 A | 10/1997 | Friesem et al. |
| 5,694,230 A | 12/1997 | Welch |
| 5,701,132 A | 12/1997 | Kollin et al. |
| 5,706,108 A | 1/1998 | Ando et al. |
| 5,707,925 A | 1/1998 | Akada et al. |
| 5,724,189 A | 3/1998 | Ferrante |
| 5,726,782 A | 3/1998 | Kato et al. |
| 5,727,098 A | 3/1998 | Jacobson |
| 5,729,242 A | 3/1998 | Margerum et al. |
| 5,731,060 A | 3/1998 | Hirukawa et al. |
| 5,731,853 A | 3/1998 | Taketomi et al. |
| 5,742,262 A | 4/1998 | Tabata et al. |
| 5,751,452 A | 5/1998 | Tanaka et al. |
| 5,760,931 A | 6/1998 | Saburi et al. |
| 5,764,414 A | 6/1998 | King et al. |
| 5,790,288 A | 8/1998 | Jager et al. |
| 5,812,608 A | 9/1998 | Valimaki et al. |
| 5,822,127 A | 10/1998 | Chen et al. |
| 5,856,842 A | 1/1999 | Tedesco |
| 5,868,951 A | 2/1999 | Schuck et al. |
| 5,886,822 A | 3/1999 | Spitzer |
| 5,892,598 A | 4/1999 | Asakawa et al. |
| 5,898,511 A | 4/1999 | Mizutani et al. |
| 5,903,395 A | 5/1999 | Rallison et al. |
| 5,907,416 A | 5/1999 | Hegg et al. |
| 5,907,436 A | 5/1999 | Perry et al. |
| 5,917,459 A | 6/1999 | Son et al. |
| 5,926,147 A | 7/1999 | Sehm et al. |
| 5,929,946 A | 7/1999 | Sharp et al. |
| 5,937,115 A | 8/1999 | Domash |
| 5,942,157 A | 8/1999 | Sutherland et al. |
| 5,945,893 A | 8/1999 | Plessky et al. |
| 5,949,302 A | 9/1999 | Sarkka |
| 5,966,223 A | 10/1999 | Friesem et al. |
| 5,985,422 A | 11/1999 | Krauter |
| 5,991,087 A | 11/1999 | Rallison |
| 5,999,314 A | 12/1999 | Asakura et al. |
| 6,042,947 A | 3/2000 | Asakura et al. |
| 6,043,585 A | 3/2000 | Plessky et al. |
| 6,075,626 A | 6/2000 | Mizutani et al. |
| 6,078,427 A | 6/2000 | Fontaine et al. |
| 6,115,152 A | 9/2000 | Popovich et al. |
| 6,127,066 A | 10/2000 | Ueda et al. |
| 6,137,630 A | 10/2000 | Tsou et al. |
| 6,169,613 B1 | 1/2001 | Amitai et al. |
| 6,176,837 B1 | 1/2001 | Foxlin |
| 6,195,206 B1 | 2/2001 | Yona et al. |
| 6,222,675 B1 | 4/2001 | Mall et al. |
| 6,222,971 B1 | 4/2001 | Veligdan et al. |
| 6,249,386 B1 | 6/2001 | Yona et al. |
| 6,259,423 B1 | 7/2001 | Tokito et al. |
| 6,259,559 B1 | 7/2001 | Kobayashi et al. |
| 6,317,083 B1 | 11/2001 | Johnson et al. |
| 6,317,227 B1 | 11/2001 | Mizutani et al. |
| 6,321,069 B1 | 11/2001 | Piirainen |
| 6,327,089 B1 | 12/2001 | Hosaki et al. |
| 6,333,819 B1 | 12/2001 | Svedenkrans |
| 6,340,540 B1 | 1/2002 | Ueda et al. |
| 6,351,333 B2 | 2/2002 | Araki et al. |
| 6,356,172 B1 | 3/2002 | Koivisto et al. |
| 6,359,730 B2 | 3/2002 | Tervonen |
| 6,359,737 B1 | 3/2002 | Stringfellow |
| 6,366,378 B1 | 4/2002 | Tervonen et al. |
| 6,392,812 B1 | 5/2002 | Howard |
| 6,409,687 B1 | 6/2002 | Foxlin |
| 6,470,132 B1 | 10/2002 | Nousiainen et al. |
| 6,486,997 B1 | 11/2002 | Bruzzone et al. |
| 6,504,518 B1 | 1/2003 | Kuwayama et al. |
| 6,524,771 B2 | 2/2003 | Maeda et al. |
| 6,545,778 B2 | 4/2003 | Ono et al. |
| 6,550,949 B1 | 4/2003 | Bauer et al. |
| 6,557,413 B2 | 5/2003 | Nieminen et al. |
| 6,563,648 B2 | 5/2003 | Gleckman et al. |
| 6,580,529 B1 | 6/2003 | Amitai et al. |
| 6,583,873 B1 | 6/2003 | Goncharov et al. |
| 6,587,619 B1 | 7/2003 | Kinoshita |
| 6,598,987 B1 | 7/2003 | Parikka |
| 6,608,720 B1 | 8/2003 | Freeman |
| 6,611,253 B1 | 8/2003 | Cohen |
| 6,646,810 B2 | 11/2003 | Harter et al. |
| 6,661,578 B2 | 12/2003 | Hedrick |
| 6,674,578 B2 | 1/2004 | Sugiyama et al. |
| 6,686,815 B1 | 2/2004 | Mirshekarl-Syahkal et al. |
| 6,721,096 B2 | 4/2004 | Bruzzone et al. |
| 6,741,189 B1 | 5/2004 | Gibbons, II et al. |
| 6,744,478 B1 | 6/2004 | Asakura et al. |
| 6,748,342 B1 | 6/2004 | Dickhaus |
| 6,750,941 B2 | 6/2004 | Satoh et al. |
| 6,757,105 B2 | 6/2004 | Niv et al. |
| 6,771,403 B1 | 8/2004 | Endo et al. |
| 6,776,339 B2 | 8/2004 | Piikivi |
| 6,781,701 B1 | 8/2004 | Sweetser et al. |

(56) References Cited

U.S. PATENT DOCUMENTS

| | | |
|---|---|---|
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,836,369 B2 | 12/2004 | Fujikawa et al. |
| 6,844,212 B2 | 1/2005 | Bond et al. |
| 6,844,980 B2 | 1/2005 | He et al. |
| 6,847,274 B2 | 1/2005 | Salmela et al. |
| 6,847,488 B2 | 1/2005 | Travis |
| 6,853,491 B1 | 2/2005 | Ruhle et al. |
| 6,864,861 B2 | 3/2005 | Schehrer et al. |
| 6,864,927 B1 | 3/2005 | Cathey |
| 6,885,483 B2 | 4/2005 | Takada |
| 6,903,872 B2 | 6/2005 | Schrader |
| 6,909,345 B1 | 6/2005 | Salmela et al. |
| 6,917,375 B2 | 7/2005 | Akada et al. |
| 6,922,267 B2 | 7/2005 | Endo et al. |
| 6,926,429 B2 | 8/2005 | Barlow et al. |
| 6,940,361 B1 | 9/2005 | Jokio et al. |
| 6,950,173 B1 | 9/2005 | Sutherland et al. |
| 6,950,227 B2 | 9/2005 | Schrader |
| 6,951,393 B2 | 10/2005 | Koide |
| 6,952,312 B2 | 10/2005 | Weber et al. |
| 6,958,662 B1 | 10/2005 | Salmela et al. |
| 6,987,908 B2 | 1/2006 | Bond et al. |
| 7,003,187 B2 | 2/2006 | Frick et al. |
| 7,018,744 B2 | 3/2006 | Otaki et al. |
| 7,021,777 B2 | 4/2006 | Amitai |
| 7,026,892 B2 | 4/2006 | Kajiya |
| 7,027,671 B2 | 4/2006 | Huck et al. |
| 7,034,748 B2 | 4/2006 | Kajiya |
| 7,053,735 B2 | 5/2006 | Salmela et al. |
| 7,058,434 B2 | 6/2006 | Wang et al. |
| 7,095,562 B1 | 8/2006 | Peng et al. |
| 7,101,048 B2 | 9/2006 | Travis |
| 7,110,184 B1 | 9/2006 | Yona et al. |
| 7,123,418 B2 | 10/2006 | Weber et al. |
| 7,126,418 B2 | 10/2006 | Hunton et al. |
| 7,126,583 B1 | 10/2006 | Breed |
| 7,132,200 B1 | 11/2006 | Ueda et al. |
| 7,149,385 B2 | 12/2006 | Parikka et al. |
| 7,151,246 B2 | 12/2006 | Fein et al. |
| 7,158,095 B2 | 1/2007 | Jenson et al. |
| 7,181,105 B2 | 2/2007 | Teramura et al. |
| 7,181,108 B2 | 2/2007 | Levola |
| 7,184,615 B2 | 2/2007 | Levola |
| 7,190,849 B2 | 3/2007 | Katase |
| 7,199,934 B2 | 4/2007 | Yamasaki |
| 7,205,960 B2 | 4/2007 | David |
| 7,205,964 B1 | 4/2007 | Yokoyama et al. |
| 7,206,107 B2 | 4/2007 | Levola |
| 7,230,767 B2 | 6/2007 | Walck et al. |
| 7,242,527 B2 | 7/2007 | Spitzer et al. |
| 7,248,128 B2 | 7/2007 | Mattila et al. |
| 7,259,906 B1 | 8/2007 | Islam |
| 7,268,946 B2 | 9/2007 | Wang |
| 7,285,903 B2 | 10/2007 | Cull et al. |
| 7,289,069 B2 | 10/2007 | Ranta |
| 7,299,983 B2 | 11/2007 | Piikivi |
| 7,313,291 B2 | 12/2007 | Okhotnikov et al. |
| 7,319,573 B2 | 1/2008 | Nishiyama |
| 7,320,534 B2 | 1/2008 | Sugikawa et al. |
| 7,323,275 B2 | 1/2008 | Otaki et al. |
| 7,336,271 B2 | 2/2008 | Ozeki et al. |
| 7,339,737 B2 | 3/2008 | Urey et al. |
| 7,339,742 B2 | 3/2008 | Amitai et al. |
| 7,375,870 B2 | 5/2008 | Schorpp |
| 7,391,573 B2 | 6/2008 | Amitai |
| 7,394,865 B2 | 7/2008 | Borran et al. |
| 7,395,181 B2 | 7/2008 | Foxlin |
| 7,397,606 B1 | 7/2008 | Peng et al. |
| 7,401,920 B1 | 7/2008 | Kranz et al. |
| 7,404,644 B2 | 7/2008 | Evans et al. |
| 7,410,286 B2 | 8/2008 | Travis |
| 7,411,637 B2 | 8/2008 | Weiss |
| 7,415,173 B2 | 8/2008 | Kassamakov et al. |
| 7,418,170 B2 | 8/2008 | Mukawa et al. |
| 7,433,116 B1 | 10/2008 | Islam |
| 7,436,568 B1 | 10/2008 | Kuykendall, Jr. |
| 7,454,103 B2 | 11/2008 | Parriaux |
| 7,457,040 B2 | 11/2008 | Amitai |
| 7,466,994 B2 | 12/2008 | Pihlaja et al. |
| 7,479,354 B2 | 1/2009 | Ueda et al. |
| 7,480,215 B2 | 1/2009 | Makela et al. |
| 7,482,996 B2 | 1/2009 | Larson et al. |
| 7,483,604 B2 | 1/2009 | Levola |
| 7,492,512 B2 | 2/2009 | Niv et al. |
| 7,496,293 B2 | 2/2009 | Shamir et al. |
| 7,500,104 B2 | 3/2009 | Goland |
| 7,528,385 B2 | 5/2009 | Volodin et al. |
| 7,545,429 B2 | 6/2009 | Travis |
| 7,550,234 B2 | 6/2009 | Otaki et al. |
| 7,567,372 B2 | 7/2009 | Schorpp |
| 7,570,429 B2 | 8/2009 | Maliah et al. |
| 7,572,555 B2 | 8/2009 | Takizawa et al. |
| 7,573,640 B2 | 8/2009 | Nivon et al. |
| 7,576,916 B2 | 8/2009 | Amitai |
| 7,577,326 B2 | 8/2009 | Amitai |
| 7,579,119 B2 | 8/2009 | Ueda et al. |
| 7,588,863 B2 | 9/2009 | Takizawa et al. |
| 7,589,900 B1 | 9/2009 | Powell |
| 7,589,901 B2 | 9/2009 | DeJong et al. |
| 7,592,988 B2 | 9/2009 | Katase |
| 7,593,575 B2 | 9/2009 | Houle et al. |
| 7,597,447 B2 | 10/2009 | Larson et al. |
| 7,599,012 B2 | 10/2009 | Nakamura et al. |
| 7,600,893 B2 | 10/2009 | Laino et al. |
| 7,602,552 B1 | 10/2009 | Blumenfeld |
| 7,616,270 B2 | 11/2009 | Hirabayashi et al. |
| 7,618,750 B2 | 11/2009 | Ueda et al. |
| 7,629,086 B2 | 12/2009 | Otaki et al. |
| 7,639,911 B2 | 12/2009 | Lee et al. |
| 7,643,214 B2 | 1/2010 | Amitai |
| 7,660,047 B1 | 2/2010 | Travis et al. |
| 7,672,055 B2 | 3/2010 | Amitai |
| 7,710,654 B2 | 5/2010 | Ashkenazi et al. |
| 7,724,441 B2 | 5/2010 | Amitai |
| 7,724,442 B2 | 5/2010 | Amitai |
| 7,724,443 B2 | 5/2010 | Amitai |
| 7,733,572 B1 | 6/2010 | Brown et al. |
| 7,747,113 B2 | 6/2010 | Mukawa et al. |
| 7,751,122 B2 | 7/2010 | Amitai |
| 7,764,413 B2 | 7/2010 | Levola |
| 7,777,819 B2 | 8/2010 | Simmonds |
| 7,778,305 B2 | 8/2010 | Parriaux et al. |
| 7,778,508 B2 | 8/2010 | Hirayama |
| 7,847,235 B2 | 12/2010 | Krupkin et al. |
| 7,864,427 B2 | 1/2011 | Korenaga et al. |
| 7,865,080 B2 | 1/2011 | Hecker et al. |
| 7,872,804 B2 | 1/2011 | Moon et al. |
| 7,884,985 B2 | 2/2011 | Amitai et al. |
| 7,887,186 B2 | 2/2011 | Watanabe |
| 7,903,921 B2 | 3/2011 | Ostergard |
| 7,907,342 B2 | 3/2011 | Simmonds et al. |
| 7,920,787 B2 | 4/2011 | Gentner et al. |
| 7,944,428 B2 | 5/2011 | Travis |
| 7,969,644 B2 | 6/2011 | Tilleman et al. |
| 7,970,246 B2 | 6/2011 | Travis et al. |
| 7,976,208 B2 | 7/2011 | Travis |
| 7,999,982 B2 | 8/2011 | Endo et al. |
| 8,000,491 B2 | 8/2011 | Brodkin et al. |
| 8,004,765 B2 | 8/2011 | Amitai |
| 8,016,475 B2 | 9/2011 | Travis |
| 8,022,942 B2 | 9/2011 | Bathiche et al. |
| RE42,992 E | 12/2011 | David |
| 8,079,713 B2 | 12/2011 | Ashkenazi |
| 8,082,222 B2 | 12/2011 | Rangarajan et al. |
| 8,086,030 B2 | 12/2011 | Gordon et al. |
| 8,089,568 B1 | 1/2012 | Brown et al. |
| 8,107,023 B2 | 1/2012 | Simmonds et al. |
| 8,107,780 B2 | 1/2012 | Simmonds |
| 8,132,948 B2 | 3/2012 | Owen et al. |
| 8,132,976 B2 | 3/2012 | Odell et al. |
| 8,136,690 B2 | 3/2012 | Fang et al. |

(56) References Cited

U.S. PATENT DOCUMENTS

| | | |
|---|---|---|
| 8,137,981 B2 | 3/2012 | Andrew et al. |
| 8,149,086 B2 | 4/2012 | Klein et al. |
| 8,152,315 B2 | 4/2012 | Travis et al. |
| 8,155,489 B2 | 4/2012 | Saarikko et al. |
| 8,160,409 B2 | 4/2012 | Large |
| 8,160,411 B2 | 4/2012 | Levola et al. |
| 8,186,874 B2 | 5/2012 | Sinbar et al. |
| 8,188,925 B2 | 5/2012 | Dejean |
| 8,189,263 B1 | 5/2012 | Wang et al. |
| 8,189,973 B2 | 5/2012 | Travis et al. |
| 8,199,803 B2 | 6/2012 | Hauske et al. |
| 8,213,065 B2 | 7/2012 | Mukawa |
| 8,233,204 B1 | 7/2012 | Robbins et al. |
| 8,253,914 B2 | 8/2012 | Kajiya et al. |
| 8,295,710 B2 | 10/2012 | Marcus |
| 8,301,031 B2 | 10/2012 | Gentner et al. |
| 8,305,577 B2 | 11/2012 | Kivioja et al. |
| 8,306,423 B2 | 11/2012 | Gottwald et al. |
| 8,314,819 B2 | 11/2012 | Kimmel et al. |
| 8,321,810 B2 | 11/2012 | Heintze |
| 8,335,040 B2 | 12/2012 | Mukawa et al. |
| 8,351,744 B2 | 1/2013 | Travis et al. |
| 8,354,806 B2 | 1/2013 | Travis et al. |
| 8,355,610 B2 | 1/2013 | Simmonds |
| 8,369,019 B2 | 2/2013 | Baker et al. |
| 8,384,694 B2 | 2/2013 | Powell et al. |
| 8,398,242 B2 | 3/2013 | Yamamoto et al. |
| 8,403,490 B2 | 3/2013 | Sugiyama et al. |
| 8,422,840 B2 | 4/2013 | Large |
| 8,427,439 B2 | 4/2013 | Larsen et al. |
| 8,432,363 B2 | 4/2013 | Saarikko et al. |
| 8,432,372 B2 | 4/2013 | Butler et al. |
| 8,447,365 B1* | 5/2013 | Imanuel ............... B60K 35/00 455/566 |
| 8,472,119 B1 | 6/2013 | Kelly |
| 8,477,261 B2 | 7/2013 | Travis et al. |
| 8,491,121 B2 | 7/2013 | Tilleman et al. |
| 8,491,136 B2 | 7/2013 | Travis et al. |
| 8,493,366 B2 | 7/2013 | Bathiche et al. |
| 8,493,662 B2 | 7/2013 | Noui |
| 8,508,848 B2 | 8/2013 | Saarikko |
| 8,578,038 B2 | 11/2013 | Kaikuranta et al. |
| 8,581,831 B2 | 11/2013 | Travis |
| 8,582,206 B2 | 11/2013 | Travis |
| 8,593,734 B2 | 11/2013 | Laakkonen |
| 8,611,014 B2 | 12/2013 | Valera et al. |
| 8,619,062 B2 | 12/2013 | Powell et al. |
| 8,633,786 B2 | 1/2014 | Ermolov et al. |
| 8,634,139 B1 | 1/2014 | Brown et al. |
| 8,639,072 B2 | 1/2014 | Popovich et al. |
| 8,643,691 B2 | 2/2014 | Rosenfeld et al. |
| 8,649,099 B2 | 2/2014 | Schultz et al. |
| 8,654,420 B2 | 2/2014 | Simmonds |
| 8,659,826 B1* | 2/2014 | Brown .................. G02B 5/18 359/402 |
| 8,670,029 B2 | 3/2014 | McEldowney |
| 8,693,087 B2 | 4/2014 | Nowatzyk et al. |
| 8,736,802 B2 | 5/2014 | Kajiya et al. |
| 8,736,963 B2 | 5/2014 | Robbins et al. |
| 8,749,890 B1 | 6/2014 | Wood et al. |
| 8,767,294 B2 | 7/2014 | Chen et al. |
| 8,810,600 B2 | 8/2014 | Bohn et al. |
| 8,814,691 B2 | 8/2014 | Haddick et al. |
| 8,830,584 B2 | 9/2014 | Saarikko et al. |
| 8,830,588 B1* | 9/2014 | Brown .............. G02B 27/0172 359/630 |
| 8,903,207 B1 | 12/2014 | Brown et al. |
| 8,913,324 B2 | 12/2014 | Schrader |
| 8,937,772 B1 | 1/2015 | Burns et al. |
| 8,938,141 B2 | 1/2015 | Magnusson |
| 9,097,890 B2* | 8/2015 | Miller ............... G02B 27/0093 |
| 2002/0021461 A1 | 2/2002 | Ono et al. |
| 2002/0131175 A1 | 9/2002 | Yagi et al. |
| 2003/0039442 A1 | 2/2003 | Bond et al. |
| 2003/0063042 A1 | 4/2003 | Friesem et al. |
| 2003/0149346 A1 | 8/2003 | Arnone et al. |
| 2003/0228019 A1 | 12/2003 | Eichler et al. |
| 2004/0089842 A1 | 5/2004 | Sutehrland et al. |
| 2004/0130797 A1* | 7/2004 | Leigh Travis ...... G02B 27/0081 359/631 |
| 2004/0188617 A1 | 9/2004 | Devitt et al. |
| 2004/0208446 A1 | 10/2004 | Bond et al. |
| 2004/0208466 A1 | 10/2004 | Mossberg et al. |
| 2005/0135747 A1 | 6/2005 | Greiner et al. |
| 2005/0136260 A1 | 6/2005 | Garcia |
| 2005/0259302 A9 | 11/2005 | Metz et al. |
| 2005/0269481 A1 | 12/2005 | David et al. |
| 2006/0093793 A1 | 5/2006 | Miyakawa et al. |
| 2006/0114564 A1 | 6/2006 | Sutherland et al. |
| 2006/0119916 A1 | 6/2006 | Sutherland et al. |
| 2006/0132914 A1 | 6/2006 | Weiss et al. |
| 2006/0215244 A1* | 9/2006 | Yosha ................. G02B 27/0101 359/15 |
| 2006/0221448 A1 | 10/2006 | Nivon et al. |
| 2006/0228073 A1 | 10/2006 | Mukawa et al. |
| 2006/0279662 A1 | 12/2006 | Kapellner et al. |
| 2007/0019152 A1 | 1/2007 | Caputo et al. |
| 2007/0019297 A1 | 1/2007 | Stewart et al. |
| 2007/0041684 A1 | 2/2007 | Popovich et al. |
| 2007/0045596 A1 | 3/2007 | King et al. |
| 2007/0089625 A1 | 4/2007 | Grinberg et al. |
| 2007/0133920 A1 | 6/2007 | Lee et al. |
| 2007/0133983 A1 | 6/2007 | Traff |
| 2007/0188837 A1 | 8/2007 | Shimizu et al. |
| 2007/0211164 A1 | 9/2007 | Olsen et al. |
| 2008/0043334 A1 | 2/2008 | Itzkovitch et al. |
| 2008/0106775 A1 | 5/2008 | Amitai et al. |
| 2008/0136923 A1 | 6/2008 | Inbar et al. |
| 2008/0151379 A1 | 6/2008 | Amitai |
| 2008/0186604 A1 | 8/2008 | Amitai |
| 2008/0198471 A1 | 8/2008 | Amitai |
| 2008/0278812 A1 | 11/2008 | Amitai |
| 2008/0285140 A1 | 11/2008 | Amitai |
| 2008/0309586 A1 | 12/2008 | Vitale |
| 2009/0017424 A1 | 1/2009 | Yoeli et al. |
| 2009/0019222 A1 | 1/2009 | Verma et al. |
| 2009/0052046 A1 | 2/2009 | Amitai |
| 2009/0052047 A1 | 2/2009 | Amitai |
| 2009/0067774 A1 | 3/2009 | Magnusson |
| 2009/0097122 A1 | 4/2009 | Niv |
| 2009/0097127 A1 | 4/2009 | Amitai |
| 2009/0121301 A1 | 5/2009 | Chang |
| 2009/0122413 A1 | 5/2009 | Hoffman et al. |
| 2009/0122414 A1 | 5/2009 | Amitai |
| 2009/0128902 A1 | 5/2009 | Niv et al. |
| 2009/0128911 A1 | 5/2009 | Itzkovitch et al. |
| 2009/0153437 A1 | 6/2009 | Aharoni |
| 2009/0190222 A1 | 7/2009 | Simmonds et al. |
| 2009/0213208 A1 | 8/2009 | Glatt |
| 2009/0237804 A1 | 9/2009 | Amitai et al. |
| 2009/0303599 A1 | 12/2009 | Levola |
| 2009/0316246 A1 | 12/2009 | Asai et al. |
| 2010/0039796 A1 | 2/2010 | Mukawa |
| 2010/0060551 A1 | 3/2010 | Sugiyama et al. |
| 2010/0060990 A1 | 3/2010 | Wertheim et al. |
| 2010/0079865 A1 | 4/2010 | Saarikko et al. |
| 2010/0092124 A1 | 4/2010 | Magnusson et al. |
| 2010/0096562 A1 | 4/2010 | Klunder et al. |
| 2010/0103078 A1 | 4/2010 | Mukawa et al. |
| 2010/0136319 A1 | 6/2010 | Imai et al. |
| 2010/0141555 A1 | 6/2010 | Rorberg et al. |
| 2010/0165465 A1 | 7/2010 | Levola |
| 2010/0171680 A1 | 7/2010 | Lapidot et al. |
| 2010/0177388 A1 | 7/2010 | Cohen et al. |
| 2010/0214659 A1 | 8/2010 | Levola |
| 2010/0231693 A1 | 9/2010 | Levola |
| 2010/0231705 A1 | 9/2010 | Yahav et al. |
| 2010/0232003 A1 | 9/2010 | Baldy et al. |
| 2010/0246004 A1 | 9/2010 | Simmonds |
| 2010/0246993 A1 | 9/2010 | Rieger et al. |
| 2010/0265117 A1 | 10/2010 | Weiss |
| 2010/0277803 A1 | 11/2010 | Pockett et al. |
| 2010/0284085 A1 | 11/2010 | Laakkonen |
| 2010/0296163 A1 | 11/2010 | Saarikko |

(56) References Cited

U.S. PATENT DOCUMENTS

| | | |
|---|---|---|
| 2010/0315719 A1 | 12/2010 | Saarikko et al. |
| 2010/0321781 A1 | 12/2010 | Levola et al. |
| 2011/0019250 A1 | 1/2011 | Aiki et al. |
| 2011/0019874 A1 | 1/2011 | Jarvenpaa et al. |
| 2011/0026128 A1 | 2/2011 | Baker et al. |
| 2011/0026774 A1 | 2/2011 | Flohr et al. |
| 2011/0038024 A1 | 2/2011 | Wang et al. |
| 2011/0050548 A1 | 3/2011 | Blumenfeld et al. |
| 2011/0096401 A1 | 4/2011 | Levola |
| 2011/0157707 A1 | 6/2011 | Tilleman et al. |
| 2011/0164221 A1 | 7/2011 | Tilleman et al. |
| 2011/0211239 A1 | 9/2011 | Mukawa et al. |
| 2011/0235179 A1 | 9/2011 | Simmonds |
| 2011/0238399 A1 | 9/2011 | Ophir et al. |
| 2011/0242349 A1 | 10/2011 | Izuha et al. |
| 2011/0242661 A1 | 10/2011 | Simmonds |
| 2011/0242670 A1 | 10/2011 | Simmonds |
| 2012/0007979 A1 | 1/2012 | Schneider et al. |
| 2012/0033306 A1 | 2/2012 | Valera et al. |
| 2012/0044572 A1 | 2/2012 | Simmonds et al. |
| 2012/0044573 A1 | 2/2012 | Simmonds et al. |
| 2012/0062850 A1 | 3/2012 | Travis |
| 2012/0099203 A1 | 4/2012 | Boubis et al. |
| 2012/0105634 A1 | 5/2012 | Meidan et al. |
| 2012/0120493 A1 | 5/2012 | Simmonds et al. |
| 2012/0127577 A1 | 5/2012 | Desserouer |
| 2012/0235900 A1 | 9/2012 | Border et al. |
| 2012/0242661 A1 | 9/2012 | Takagi et al. |
| 2012/0280956 A1 | 11/2012 | Yamamoto et al. |
| 2012/0300311 A1 | 11/2012 | Simmonds et al. |
| 2013/0069850 A1 | 3/2013 | Mukawa et al. |
| 2013/0101253 A1 | 4/2013 | Popovich et al. |
| 2013/0138275 A1 | 5/2013 | Nauman et al. |
| 2013/0141937 A1 | 6/2013 | Katsuta et al. |
| 2013/0170031 A1 | 7/2013 | Bohn et al. |
| 2013/0184904 A1* | 7/2013 | Gadzinski ............ G01C 23/005 701/16 |
| 2013/0200710 A1 | 8/2013 | Robbins |
| 2013/0249895 A1 | 9/2013 | Westerinen et al. |
| 2013/0257848 A1 | 10/2013 | Westerinen et al. |
| 2013/0258701 A1 | 10/2013 | Westerinen et al. |
| 2013/0314793 A1 | 11/2013 | Robbins et al. |
| 2013/0322810 A1 | 12/2013 | Robbins |
| 2013/0328948 A1 | 12/2013 | Kunkel et al. |
| 2014/0043689 A1* | 2/2014 | Mason ............... G02B 27/0101 359/630 |
| 2014/0104665 A1 | 4/2014 | Popovich et al. |
| 2014/0104685 A1 | 4/2014 | Bohn et al. |
| 2014/0140653 A1 | 5/2014 | Brown et al. |
| 2014/0140654 A1* | 5/2014 | Brown ................. G02B 5/1814 385/10 |
| 2014/0146394 A1 | 5/2014 | Tout et al. |
| 2014/0152778 A1 | 6/2014 | Ihlenburg et al. |
| 2014/0168055 A1 | 6/2014 | Smith |
| 2014/0168260 A1 | 6/2014 | O'Brien et al. |
| 2014/0168735 A1 | 6/2014 | Yuan et al. |
| 2014/0172296 A1 | 6/2014 | Shtukater |
| 2014/0176528 A1 | 6/2014 | Robbins |
| 2014/0204455 A1 | 7/2014 | Popovich et al. |
| 2014/0211322 A1 | 7/2014 | Bohn et al. |
| 2014/0218801 A1 | 8/2014 | Simmonds et al. |
| 2015/0010265 A1 | 1/2015 | Popovich et al. |
| 2015/0316768 A1* | 11/2015 | Simmonds ......... G02B 27/0172 345/32 |

FOREIGN PATENT DOCUMENTS

| | | |
|---|---|---|
| EP | 2 110 701 | 10/2009 |
| EP | 2 225 592 | 9/2010 |
| EP | 2 381 290 | 10/2011 |
| EP | 2 733 517 | 5/2014 |
| FR | 2677463 | 12/1992 |
| GB | 2 115 178 A | 9/1983 |
| JP | 2004-157245 | 6/2004 |
| WO | WO-99/52002 | 10/1999 |
| WO | WO-03/081320 A1 | 10/2003 |
| WO | WO-2006/002870 | 1/2006 |
| WO | WO-2007/130130 A2 | 11/2007 |
| WO | WO-2007/130130 A3 | 11/2007 |
| WO | WO-2009/013597 A2 | 1/2009 |
| WO | WO-2009/077802 | 6/2009 |
| WO | WO-2010/067114 | 6/2010 |
| WO | WO-2010/067117 | 6/2010 |
| WO | WO-2010/125337 A2 | 11/2010 |
| WO | WO-2010/125337 A3 | 11/2010 |
| WO | WO-2011/012825 | 2/2011 |
| WO | WO-2011/051660 A1 | 5/2011 |
| WO | WO-2011/055109 A2 | 5/2011 |
| WO | WO-2011/107831 | 9/2011 |
| WO | WO-2013/027006 A1 | 2/2013 |
| WO | WO-2013/033274 A1 | 3/2013 |
| WO | WO-2013/163347 | 10/2013 |
| WO | WO-2014/091200 | 6/2014 |

OTHER PUBLICATIONS

U.S. Appl. No. 13/250,940, filed Sep. 30, 2011, Stahl et al.
U.S. Appl. No. 13/432,662, filed Mar. 28, 2012, Brown et al.
U.S. Appl. No. 14/497,280, filed Sep. 25, 2014, Stanley et al.
U.S. Appl. No. 14/715,332, filed May 18, 2015, Brown et al.
U.S. Appl. No. 14/814,020, filed Jul. 30, 2015, Brown et al.
U.S. Appl. No. 61/344,748, filed Sep. 28, 2010, Unknown.
U.S. Appl. No. 61/457,835, filed Jun. 16, 2011, Unknown.
U.S. Appl. No. 61/573,066, filed Aug. 24, 2012, Unknown.
U.S. Appl. No. 61/573,082, filed Aug. 29, 2011, Unknown.
U.S. Appl. No. 61/573,121, filed Sep. 7, 2011, Unknown.
U.S. Appl. No. 61/573,156, filed Sep. 16, 2011, Unknown.
U.S. Appl. No. 61/573,175, filed Sep. 19, 2011, Unknown.
U.S. Appl. No. 61/573,176, filed Sep. 19, 2011, Unknown.
U.S. Appl. No. 61/573,196, filed Sep. 25, 2011, Unknown.
U.S. Appl. No. 61/627,202, filed Oct. 7, 2011, Unknown.
U.S. Appl. No. 61/687,436, filed Apr. 25, 2012, Waldern et al.
U.S. Appl. No. 61/689,907, filed Apr. 25, 2012, Waldern et al.
U.S. Appl. No. 61/796,795, filed Nov. 20, 2012, Unknown.
U.S. Appl. No. 61/850,856, filed Feb. 25, 2013, Unknown.
Amendment and Reply for U.S. Appl. No. 12/571,262, mail date Dec. 16, 2011, 7 pages.
Amitai, Y., et al. "Visor-display design based on planar holographic optics," Applied Optics, vol. 34, No. 8, Mar. 10, 1995, pp. 1352-1356.
Ayras, et al., "Exit pupil expander with a large field of view based on diffractive optics", Journal of the Society for Information Display, 17/8, 2009, pp. 659-664.
Cameron, A., The Application of Holograhpic Optical Waveguide Technology to Q-Sight Family of Helmet Mounted Displays, Proc. of SPIE, vol. 7326, 73260H-1, 2009, 11 pages.
Caputo, R. et al., POLICRYPS Switchable Holographic Grating: A Promising Grating Electro-Optical Pixel for High Resolution Display Application; Journal of Display Technology, vol. 2, No. 1, Mar. 2006, pp. 38-51, 14 pages.
Crawford, "Switchable Bragg Gratings", Optics & Photonics News, Apr. 2003, pp. 54-59.
Extended European Search Report for EP Application No. 13192383, dated Apr. 2, 2014, 7 pages.
Final Office Action in U.S. Appl. No. 13/864,991, dated Apr. 2, 2015, 16 pages.
Final Office Action on U.S. Appl. No. 13/869,866 Dated Oct. 3, 2014, 17 pages.
Final Office Action on U.S. Appl. No. 13/250,858 Dated Feb. 4, 2015, 18 pages.
Final Office Action on U.S. Appl. No. 13/250,940 Dated Oct. 17, 2014, 15 pages.
Final Office Action on U.S. Appl. No. 13/892,026 Dated Apr. 3, 2015, 17 pages.
Final Office Action on U.S. Appl. No. 13/892,057 Dated Mar. 5, 2015, 21 pages.
Final Office Action on U.S. Appl. No. 14/038,400 Dated Aug. 10, 2015, 32 pages.

(56) References Cited

OTHER PUBLICATIONS

First office action received in Chinese patent application No. 201380001530.1, dated Jun. 30, 2015, 9 pages with English translation.
International Preliminary Report on Patentability for PCT Application No. PCT/US2013/038070, dated Oct. 28, 2014, 6 pages.
International Search Report and Written Opinion regarding PCT/US2013/038070, mail date Aug. 14, 2013, 14 pages.
Irie, Masahiro, Photochromic diarylethenes for photonic devices, Pure and Applied Chemistry, 1996, pp. 1367-1371, vol. 68, No. 7, IUPAC.
Levola, et al., "Replicated slanted gratings with a high refractive index material for in and outcoupling of light" Optics Express, vol. 15, Issue 5, pp. 2067-2074 (2007).
Moffitt, "Head-Mounted Display Image Configurations", retrieved from the internet at http://www.kirkmoffitt.com/hmd_image_configurations.pdf on Dec. 19, 2014, dated May 2008, 25 pages.
Non-Final Office Action on U.S. Appl. No. 13/869,866 Dated Jul. 22, 2015, 28 pages.
Non-Final Office Action on U.S. Appl. No. 13/892,026 Dates Aug. 6, 2015, 22 pages.
Non-Final Office Action on U.S. Appl. No. 13/892,057 dated Jul. 30, 2015, 29 pages.
Non-Final Office Action on U.S. Appl. No. 13/250,858 dated Jun. 12, 2015, 20 pages.
Non-Final Office Action on U.S. Appl. No. 13/250,858 Dated Sep. 15, 2014, 16 pages.
Non-Final Office Action on U.S. Appl. No. 13/250,940 Dated Mar. 18, 2015, 17 pages.
Non-Final Office Action on U.S. Appl. No. 13/432,662 Dated May 27, 2015, 15 pages.
Non-Final Office Action on U.S. Appl. No. 13/844,456 Apr. 1, 2015, 16 Pages.
Non-Final Office Action on U.S. Appl. No. 13/864,991 Dated Oct. 22, 2014, 16 pages.
Non-Final Office Action on U.S. Appl. No. 13/869,866 Dated May 28, 2014, 16 pages.
Non-Final Office Action on U.S. Appl. No. 14/038,400 Dated Feb. 5, 2015, 18 pages.
Non-Final Office Action on U.S. Appl. No. 14/044,676 Dated Apr. 9, 2015, 13 pages.
Non-Final Office Action on U.S. Appl. No. 14/109,551 Dated Jul. 14, 2015, 32 pages.
Non-Final Office Action on U.S. Appl. No. 14/152,756, mail date Aug. 25, 2015, 39 pages.
Non-Final Office Action on U.S. Appl. No. 14/168,173 Dated Jun. 22, 2015, 14 pages.
Non-Final Office Action on U.S. Appl. No. 14/225,062 Dated May 21, 2015, 11 pages.
Nordin, G., et al., "Diffraction properties of stratified volume holographic optical elements," Journal of the Optical Society of America A., vol. 9, No. 12, Dec. 1992, pp. 2206-2217, 12 pages.
Notice of Allowance for U.S. Appl. No. 12/700,557, mail date Oct. 22, 2013, 9 pages.
Notice of Allowance on U.S. Appl. No. 13/250,970 dated Sep. 16, 2014, 7 pages.
Notice of Allowance on U.S. Appl. No. 13/251,087 Dated Jul. 17, 2014, 8 pages.
Notice of Allowance on U.S. Appl. No. 13/355,360 Dated Apr. 10, 2014, 7 pages.
Notice of Allowance on U.S. Appl. No. 14/038,400, dated Oct. 30, 2015, 9 pages.
Office Action for U.S. Appl. No. 12/571,262, mail date Sep. 28, 2011, 5 pages.
Office Action for U.S. Appl. No. 12/700,557, mail date Aug. 9, 2013, 12 pages.
Office Action for U.S. Appl. No. 12/700,557, mail date Feb. 4, 2013, 11 pages.
Office Action for U.S. Appl. No. 13/250,621, mail date May 21, 2013, 10 pages.
Office Action for U.S. Appl. No. 13/250,858 Dated Feb. 19, 2014, 13 pages.
Office Action for U.S. Appl. No. 13/250,858, mail date Oct. 28, 2013, 9 pages.
Office Action for U.S. Appl. No. 13/250,940, mail date Aug. 28, 2013, 10 pages.
Office Action for U.S. Appl. No. 13/250,940, mail date Aug. 28, 2013, 15 pages.
Office Action for U.S. Appl. No. 13/250,940, mail date Mar. 12, 2013, 11 pages.
Office Action for U.S. Appl. No. 13/250,970, mail date Jul. 30, 2013, 4 pages.
Office Action for U.S. Appl. No. 13/250,994, mail date Sep. 16, 2013, 11 pages.
Office Action for U.S. Appl. No. 13/355,360, mail date Sep. 12, 2013, 7 pages.
Office Action on U.S. Appl. No. 13/250,940 Dated Mar. 25, 2014, 12 pages.
Office Action on U.S. Appl. No. 13/251,087 Dated Mar. 28, 2014, 12 pages.
Office Action on U.S. Appl. No. 13/892,026 Dated Dec. 8, 2014, 19 pages.
Office Action on U.S. Appl. No. 13/892,057 Dated Nov. 28, 2014, 17 pages.
Office Action, U.S. Appl. No. 10/696,507, mailed on Nov. 13, 2008, 15 pages.
Plastic has replaced glass in photochromic lens, www.plastemart.com, 2003, 1 page.
Press Release, "USAF Awards SBIR Labs an SBIR Contract for Wide Field of View HUD", SBG Labs—DigiLens, Apr. 2013, 1 page.
Press Release: "Navy awards SGB Labs a contract for HMDs for simulation and training", Press releases, DigiLens, Oct. 2012, pp. 1-2, retrieved from the internat at http://www.digilens.com/pr10-2012.2.php. 2 pages.
Requirement for Restriction/Election on U.S. Appl. No. 13/844,456 Dated Sep. 12, 2014, 23 pages.
Restriction Requirement for U.S. Appl. No. 12/700,557, mail date Oct. 17, 2012, 5 pages.
Schechter, et al., "Compact beam expander with linear gratings", Applied Optics, vol. 41, No. 7, Mar. 1, 2002, pp. 1236-1240.
Urey, "Diffractive exit pupil expander for display applications" Applied Optics, vol. 40, Issue 32, pp. 5840-5851 (2001).
Webster's Third New International Dictionary 433 (1986), 3 pages.
Wisely, P.L., Head up and head mounted display performance improvements through advanced techniques in the manipulation of light, Proc. of SPIE vol. 7327, 732706-1, 2009, 10 pages.
Final Office Action on U.S. Appl. No. 13/250,858, dated Oct. 7, 2015, 20 pages.
Final Office Action on U.S. Appl. No. 13/432,662, dated Oct. 29, 2015, 9 pages.
Non-Final Office Action on U.S. Appl. No. 13/250,858, dated Mar. 18, 2016, 20 pages.
Notice of Allowance on U.S. Appl. No. 13/432,662, dated Feb. 18, 2016, 10 pages.

* cited by examiner

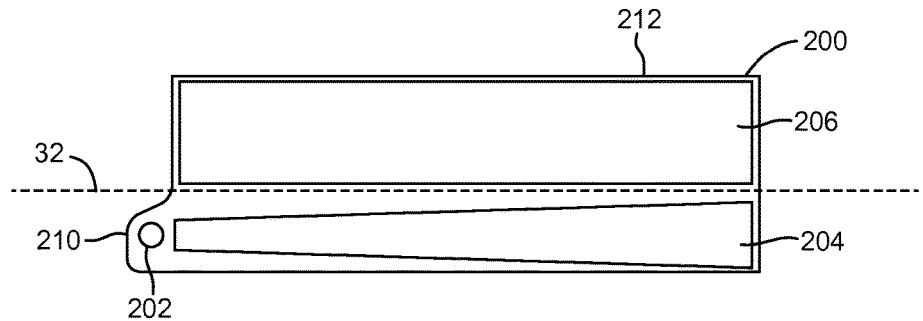
FIG. 3
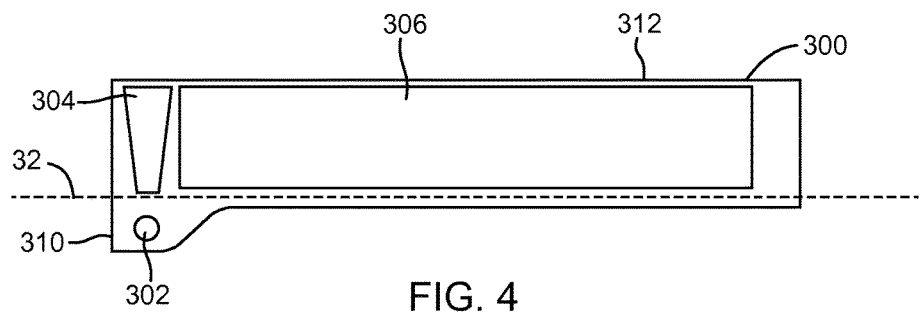
FIG. 4
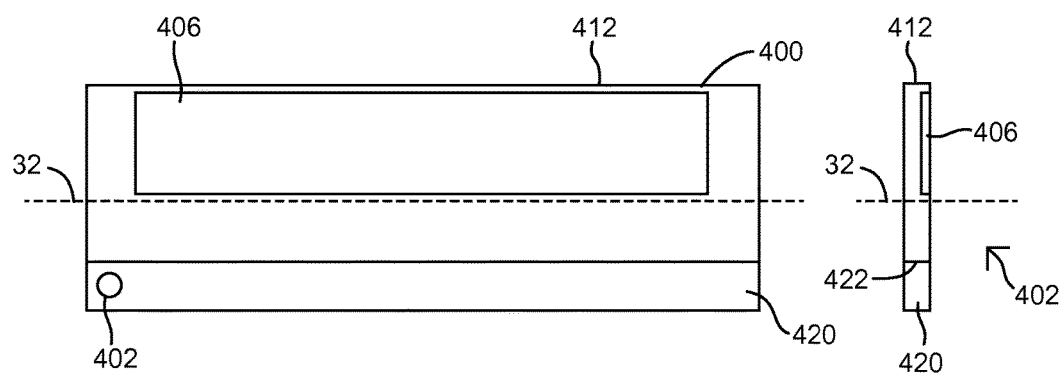 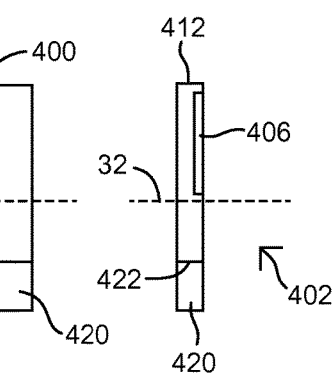
FIG. 5　　　　　FIG. 6

AUTOMOTIVE HEAD UP DISPLAY (HUD)

CROSS REFERENCE TO RELATED APPLICATIONS

The present application is related to U.S. patent application Ser. No. 14/814,020 (now U.S. Pat. No. 9,523,852) filed on Jul. 30, 2015, entitled "Micro Collimator System and Method for a Head Up Display (HUD)," invented by Robert D. Brown et al., incorporated herein by reference in its entirety and assigned to the assignee of the present application; U.S. patent application Ser. No. 14/715,332 filed on May 18, 2015, entitled "A Turning Light Pipe For A Pupil Expansion System And Method," incorporated herein by reference in its entirety and assigned to the assignee of the present application; U.S. patent application Ser. No. 14/497,280 filed on Sep. 25, 2014 entitled "Systems And Methods of Using Fold Gratings for Dual Axis Expansion," incorporated herein by reference in its entirety; U.S. patent application Ser. No. 13/432,662 (now U.S. Pat. No. 9,366,864) filed on Mar. 28, 2012, entitled "System For And Method of Catadioptric Collimation In A Compact Head Up Display (HUD)," incorporated herein by reference in its entirety and assigned to the assignee of the present application which a continuation-in-part application of: U.S. Pat. No. 8,634,139 (now U.S. Pat. No. 8,634,139) filed on Sep. 30, 2011, entitled "System For And Method of Catadioptric Collimation In A Compact Head Up Display (HUD," incorporated herein by reference in its entirety and assigned to the assignee of the present application; "U.S. patent application Ser. No. 13/250,940, entitled, "Head Up Display (HUD) Utilizing Diffractive Gratings Having Optimized Efficiency," filed on Sep. 30, 2011, incorporated herein by reference in its entirety, and assigned to the assignee of the present application; U.S. patent application Ser. No. 13/250,858, entitled, "Ultra-Compact HUD Utilizing Waveguide Pupil Expander With Surface Relief Gratings In High Refractive Index Materials," filed on Sep. 30, 2011, incorporated herein by reference in its entirety, and assigned to the assignee of the present application; U.S. Pat. No. 8,903,207, entitled, "System for and Method of Extending Vertical Field of View in Head Up Display Utilizing a Waveguide Combiner," filed on Sep. 30, 2011, incorporated herein by reference in its entirety, and assigned to the assignee of the present application; U.S. Pat. No. 8,937,772, entitled, "System For and Method of Stowing HUD Combiners," filed on Sep. 30, 2011, and assigned to the assignee of the present application, incorporated herein by reference in its entirety; and U.S. Pat. No. 8,749,890, entitled, "Compact Head Up Display (HUD) for Cockpits with Constrained Space Envelopes," filed on Sep. 30, 2011, incorporated herein by reference herein in its entirety and assigned to the assignee of the present application.

BACKGROUND

The inventive concepts disclosed herein relate to head up displays (HUDs). More particularly, embodiments of the inventive concepts disclosed herein relate to head up displays (HUDs) for use in small space envelope including but not limited to fixed combiner HUDs for automotive applications.

HUDs provide significant safety and operational benefits including better situational awareness for an operator of equipment, such as, a vehicle. The HUDs can provide instrumentation information into the operator's view of the environment as well as enhance the operator's view of the environment using data from sensors, databases (e.g., maps) or other equipment. Vehicle instrumentation information provided in the operator's field of view of the environment allows the driver of the automobile to view speed, warning lights, and other information without diverting his or her eyes from the environment.

Conventional HUDs are generally relatively large, expensive, and difficult to fit into small space envelopes associated with vehicles. Often, conventional HUDs rely on large optical components to form adequate field of view and viewing eye box. The large optical components are often associated with collimating or non-collimating projectors and include lenses, prisms, mirrors, etc. For example, U.S. Pat. No. 6,359,737 discloses a HUD that uses a conventional projector to display information on a curved windshield used as a combiner. Using a windshield combiner adds to the expense of the projector and can require unique optics for each windshield design. Also, the conventional projector of U.S. Pat. No. 6,359,737 has a large space envelope (which can have a volume of approximately 10 liters) and the windshield/combiner of U.S. Pat. No. 6,359,737 has a small field of view such as 5 degrees.

Substrate guided HUDs have been proposed which use waveguide technology with diffraction gratings to preserve eye box size while reducing size of the HUD. U.S. Pat. No. 4,309,070 issued St. Leger Searle and U.S. Pat. No. 4,711,512 issued to Upatnieks disclose substrate waveguide HUDs. It is desirable to provide HUDs in a compact arrangement suitable for automobile applications.

Therefore, there is a need for compact, low cost HUD systems. Further, there is a need for a compact HUD with a wide field of view. Yet further, there is also a need for a small volume, lightweight, lower cost HUD for vehicle applications. Yet further still, there is a need a HUD that provides virtual images (e.g., enhanced images and mapping images) and instrumentation information to different focal lengths using a waveguide combiner. Still further, there is a need for there is a need a HUD that provides virtual images (enhanced images and mapping images) and instrumentation information to different focal lengths without requiring a large projector.

SUMMARY

In one aspect, embodiments of the inventive concepts disclosed herein are directed to a head up display. The head up display is for use in an automotive application. The head up display includes a waveguide combiner and a compact projector.

In a further aspect, embodiments of the inventive concepts disclosed herein are directed to a waveguide combiner for a head up display (HUD). The waveguide combiner includes an elongated transparent medium having a width of the elongated transparent medium substantially greater than a height of the elongated transparent medium. The elongated transparent medium has elongated sides extending across the width. The waveguide combiner also includes an output coupler configured to expand an image provided to the elongated transparent medium in a first direction, and an expansion element configured to expand the image provided to the elongated transparent medium in a second direction. The second direction is perpendicular to the first direction. The waveguide combiner also includes an input coupler disposed below the output coupler.

In a further aspect, embodiments of the inventive concepts disclosed herein are directed to a method of providing information to a driver. The method includes projecting light representing instrumentation information from a first image source to a waveguide combiner. The instrumentation information is provided on the waveguide combiner at a first focal point. The method also includes providing light representing conformal information from a second image source to an input grating of the waveguide combiner and expanding the conformal information in two axes for display on the waveguide combiner at an output grating. The conformal information is at second focal point farther from the driver than the first focal point.

In still further aspect, embodiments of the inventive concepts disclosed herein are directed to a head up display. The head up display includes a waveguide combiner having an input coupler, and an output grating, and a projector configured to provide light to the input grating. The light enters the waveguide combiner through the input grating, and a pupil associated with the projector is expanded in a first direction by the turning grating and is expanded in a second direction by the output grating.

BRIEF DESCRIPTION OF THE DRAWINGS

Exemplary embodiments of the inventive concepts disclosed herein are hereafter described with reference to the accompanying drawings, wherein like numerals denote like elements; and:

FIG. 3 is a front view simplified schematic drawing of a waveguide combiner for the HUD system illustrated in FIG. 1 in accordance with some exemplary embodiments of the inventive concepts disclosed herein;

FIG. 4 is a front view simplified schematic drawing of a waveguide combiner for the HUD system illustrated in FIG. 1 in accordance with some exemplary embodiments of the inventive concepts disclosed herein;

FIG. 5 is a front view simplified schematic drawing of a waveguide combiner system for the HUD system illustrated in FIG. 1 in accordance with some exemplary embodiments of the inventive concepts disclosed herein;

FIG. 6 is a side view schematic drawing of the waveguide combiner system illustrated in FIG. 5;

DETAILED DESCRIPTION

Figure 1:
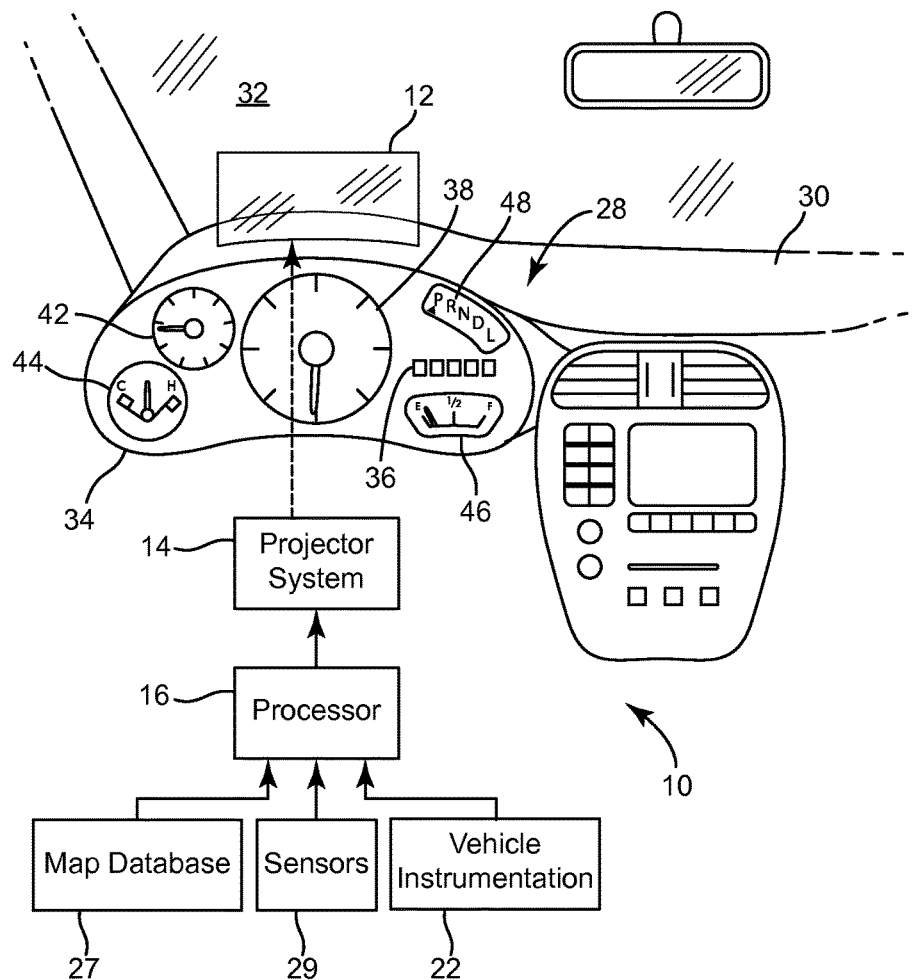
FIG. 1 is a general block diagram of a head up display (HUD) system in an automotive environment in accordance with some exemplary embodiments of the inventive concepts disclosed herein.

Before describing in detail the particular improved system and method, it should be observed that the inventive concepts disclosed herein include, but are not limited to, a novel structural combination of optical components and not in the particular detailed configurations thereof. Accordingly, the structure, methods, functions, control and arrangement of components have been illustrated in the drawings by readily understandable block representations and schematic drawings, in order not to obscure the disclosure with structural details which will be readily apparent to those skilled in the art, having the benefit of the description herein. Further, the inventive concepts disclosed herein are not limited to the particular embodiments depicted in the exemplary diagrams, but should be construed in accordance with the language in the claims.

With reference to FIG. 1, a head up display (HUD) system 10 can be utilized in various applications, including aviation, medical, naval, targeting, ground based, military, entertainment, simulation, vehicular, etc. In some embodiments, the HUD system 10 is configured for automobile or vehicular applications and includes a fixed combiner such as a waveguide combiner 12. The term fixed combiner as used herein refers to a combiner having a set position or positions in an environment, such as a set position in an automotive interior and not attached to a user in some embodiments. The position of the fixed combiner can be adjusted for operator preference or optical performance without departing from its fixed nature in some embodiments. The fixed combiner can also be stowed, moved or otherwise adjusted without departing from its fixed nature in some embodiments.

In some embodiments, the HUD system 10 is configured for use in dashboard environments with limited space for projector optics. The HUD system 10 is compact in some embodiments and yet provides an appropriate field of view and eye box for automotive applications in some embodiments.

The HUD system 10 includes the waveguide combiner 12, a projector 14 sending light to the waveguide combiner 12, and a processor 16. The processor 16 is coupled to vehicle instrumentation 22, a sensor system 29, and a map database 27 in some embodiments. The projector 14 provides light (e.g. one or more images) to the waveguide combiner 12. The projector 14 provides light associated with a first image as collimated or near collimated light (e.g., having a focal point of at a great distance) in front of the waveguide combiner 12) in some embodiments. The projector 14 can also provide light associated with a second image at a focal length less than the focal length associated with the first image (e.g., zero to 20 feet (approximately 8 feet) in front of the waveguide combiner 12) in some embodiments.

In some embodiments, the projector 14 provides light associated with a first image as collimated light (e.g., focused at infinity or near infinity). In some embodiments, the first image provides conformal information associated with data from one or both of the sensor system 29 and the map database 27 and the second image includes the vehicle instrumentation information associated with data from the vehicle instrumentation 22. In some embodiments, the first image provides conformal information associated with data from one or both of the sensor system 29 and the map database 27 and the vehicle instrumentation information associated with data from the vehicle instrumentation 22.

The waveguide combiner 12 allows simultaneous viewing of the one or more images from the projector 14 and a real world scene in some embodiments. The images can include graphic and/or text information (e.g., instrumentation information, warnings) in some embodiments. In addition, the images can include synthetic or enhanced vision images which can be viewed conformally on the real world scene through the waveguide combiner 12.

The conformal information can include synthetically generated images based upon terrain or map databases such as the map database 27 and/or sensed images from the sensor system 29. The map database can be a Google® map database, a global positioning system (GPS) database, or other geographic database in some embodiments. The sensor system 29 can be an enhanced vision system (EVS) in some embodiments. The sensor system 29 includes one or more of an infrared sensor, visible light camera, or other sensor devices for providing images of an environment.

In some embodiments, the projector 14 is a compact projector utilizing one or more micro image sources and follows the design of the projectors discussed in U.S. patent application Ser. No. 14/814,020 (now U.S. Pat. No. 9,523,852) filed on July 30,2015 entitled "Micro Collimator System and Method for a Head Up Display (HUD)," invented by Robert D. Brown et al., incorporated herein by reference. The projector 14 is a catadioptric, on axis projector requiring a small volume (less than 1 liter) in some embodiments. The projector 14 can use compact optics in a spatially constrained package without significant spatial distance between components. In some embodiments, the projector 14 includes a field lens and a curved reflector attached to a polarizing beam splitter to project collimated or near collimated light.

The processor 16 is a computing platform with video or graphics processing capabilities in some embodiments (e.g., a HUD computer system) and creates graphic data for the one or more images provided by the projector 14. The processor 16 can merge images derived from data from the sensor system 29, the map database 27 and the vehicle instrumentation 22 in some embodiments. For example, the processor 16 can cause the HUD system 10 to provide one or more images representing terrain or map features and/or vehicle instrumentation information in some embodiments. The processor 16 can spatially separate information displayed on the waveguide combiner 12 for appropriate viewing (e.g., conformal images are provided in the center of the field of view while textual and other symbols representing vehicle instrumentation are provided to the side or below the conformal images) in some embodiments.

In some embodiments, the processor 16 includes memories for storing image frames from the vehicle instrumentation 22, the sensor system 29 and the map database 27. The processor 16 can be any type of computer, digital signal process, graphics processor, computing device, or combination thereof and includes routines for adjusting contrast and color presentation, prioritizing image presentation, merging or blending images, and conformally registering the images.

The HUD system 10 is employed in an automotive environment 28 including a glare shield 30, a windshield 32, and a dashboard display 34 in some embodiments. The dashboard display 34 includes a set of warning lights 36, a speedometer 38, a tachometer 42, a temperature gauge 44, a fuel gauge 46, and a gear selection indicator 48. The configuration of dashboard display 34 is shown in exemplary fashion only. The vehicle instrumentation 22 provides the data or controls such that dashboard display 34 provides the appropriate parameters for viewing in some embodiments. The parameters shown on dashboard display 34 can be provided on the waveguide combiner 12 in some embodiments.

Figure 2:
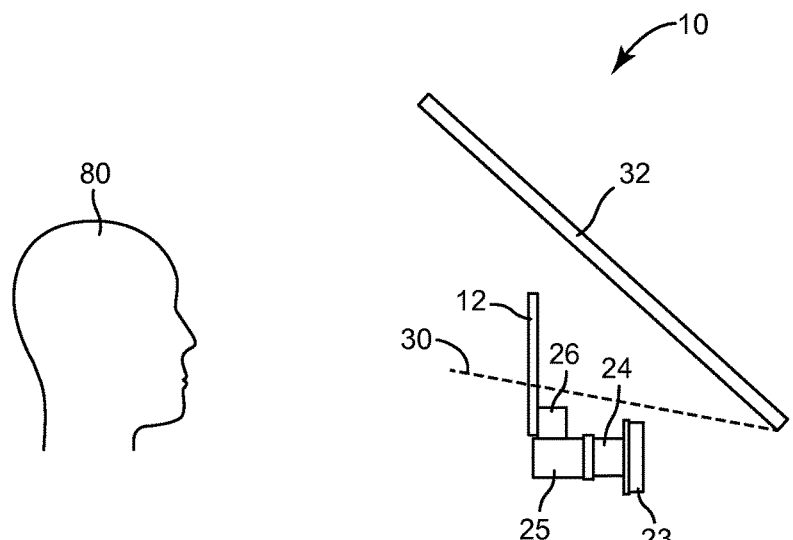
FIG. 2 is a side view simplified schematic diagram of the HUD system illustrated in FIG. 1 in accordance with some exemplary embodiments of the inventive concepts disclosed herein.

With reference to FIG. 2, the HUD system 10 includes the projector 14 below a top surface of the glare shield 30 below the windshield 32. The projector 14 is attached to the waveguide combiner 12 in some embodiments. The waveguide combiner 12 is disposed in front of a driver 80 in some embodiments. In some embodiments, the waveguide combiner 12 is aligned with the view of the driver 80 under normal operating conditions.

The projector 14 includes an image source 23, one or more lenses 24, an element 25 and an element 26. Light is provided from image source 23 through lenses 24 to the element 25 and the element 26 to the waveguide combiner 12. Light travels through the waveguide combiner 12 and is ejected toward the driver 80. The lenses 24 can be a single field lens with a diffractive coating, the element 25 can be a polarizing beam splitter with a curved reflector and a retarder film, and the element 26 can be a mirror for folding light into the waveguide combiner 12. Element 25 can also include a corrector lens.

The image source 23 can be any device for providing an image including but not limited to a CRT display, an LED display, an organic light emitting diode (OLED) display, an active matrix liquid crystal display (AMLCD), a liquid crystal on silicon (LCOS) display, etc. In some embodiments, the image source 23 is a micro display and provides linearly polarized light (e.g., S or P polarized). The image source 23 can be a liquid crystal display on silicon (LCOS) display in some embodiments. In some embodiments, the image source 23 includes a light source and an image device situated on opposite sides of the element 25 embodied as a polarizing beam splitter. Projector 14 is preferably tightly coupled reducing susceptibility to dust and moisture. Large mirrors are not required in projector 14 in some embodiments.

The lenses 24 and elements 25 and 26 provide a path for near collimated light (e.g., at a focal length of 10-100 feet) in some embodiments. In some embodiments, the image is provided at a virtual location greater than 100 feet in front of the hood of the automobile. The elements 25 and 26 can include beam splitters, mirrors, lenses or other optical elements for providing the image to the waveguide combiner 12 in some embodiments.

In some embodiments, the projector 14 is similar to the projectors discussed in the following applications: U.S. patent application Ser. No. 14/814,020(now U.S. Pat. No. 9,523,852) filed on Jul. 30, 2015 entitled "Micro Collimator System and Method for a Head Up Display (HUD)," invented by Robert D. Brown et al., incorporated herein by reference in its entirety; U.S. patent application Ser. No. 14/715,332 filed on May 18, 2015, entitled "A Turning Light Pipe For A Pupil Expansion System And Method," incorporated herein by reference in its entirety; U.S. patent application Ser. No. 14/497,280 filed on Sep. 25, 2014 entitled "Systems And Methods of Using Fold Gratings for Dual Axis Expansion," incorporated herein by reference in its entirety; and U.S. patent application Ser. No. 13/432,662 (now U.S. Pat. No. 9,366,864) filed on Mar. 28, 2012 entitled "System For And Method of Catadioptric Collimation In A Compact Head Up Display (HUD)," incorporated herein by reference in its entirety: and U.S. Pat. No. 8,634,139 incorporated herein by reference in its entirety. The projectors in the above references incorporated herein by reference can be configured to provide less than fully collimated light in accordance with the focal lengths described herein.

In some embodiments, the waveguide combiner 12 is 1 inch or less thick (e.g. less than ½ an inch thick). In some embodiments both projector 14 and waveguide combiner 12 are provide in a tiltable or rotatable bracket that allows the waveguide combiner 12 to be adjusted to driver preferences, height, etc. This allows the eye box height to be adjusted.

With reference to FIG. 3, a waveguide combiner 200 can be used as the waveguide combiner 12 (FIG. 1). The waveguide combiner 200 includes a transparent medium 212. The transparent medium is glass or plastic (e.g., one or more layers) and includes an input coupler 202 disposed on an outward extending portion 210, an expansion element 204 and an output coupler 206. The transparent medium 212 is elongated having a larger width than height in some embodiments.

In some embodiments, the width is three or more times greater than the height. In some embodiments, the width is between 11 and 12 inches without the outward extending portion 210 and the height is between 3 and 4 inches above the top surface of the glareshield. The input coupler 202 and the expanding element 204 are disposed below a top surface of the glare shield 30 in some embodiments. The output coupler 206 has an area of 11 inches by 2 inches or more in some embodiments.

The substrate waveguide 200 can have a variety of shapes including generally rectangular, oval, circular, tear drop-shaped, hexagonal, rectangular with rounded corners, square-shaped, etc. Layers of medium 212 can be used to provide color or to increase field of view. For example, each layer of the medium 212 can include its own input coupler, output coupler and expansion element for propagating a particular field of view or color in some embodiments.

In some embodiments, the input coupler 202, the expansion element 204 and the output coupler 206 are diffraction gratings (e.g., surface relief gratings, volume holograms, switchable Bragg gratings (SBG), etc.). In some embodiments, the input coupler 202 is a surface relief grating and the expansion element 204 and the output coupler 206 are volume holograms or SBGs. The output coupler 306 is a gradient output coupling grating that provides excellent image quality and acceptable brightness in some embodiments in some embodiments. The input coupler 202 is implemented as surface relief gratings in high refractive index (e.g., n≥1.5) dielectric materials in some embodiments. In some embodiments, one or more of the input coupler 202, and the expansion element 204 and the output coupler 206 are comprised of reflective arrays.

In some embodiments, the expansion element 204 is a turning grating, such as a SBG or volume hologram configured to expand the pupil in one direction (e.g., left-to-right or horizontally in FIG. 3) and change the direction of light propagation in the waveguide combiner 12. The expansion element 204 can have a trapezoidal shape and receives light from the input coupler 202 which has a circular shape corresponding to the pupil of the projector 14 (FIG. 1). The pupil of the projector 14 has a diameter of 0.25 to 1.0 inches in some embodiments. The input coupler 202 diffracts light toward the expansion element 204 which turns the light toward the output coupler 206. The light travels by total internal reflection from the input coupler 202 to the output coupler 206. The output coupler 206 diffracts the light toward the driver 80 (FIG. 2) and out of the substrate waveguide 200 in some embodiments.

The input coupler 202 has a greater efficiency than the output coupler 206 in some embodiments. In some embodiments, the input coupler 202 has an efficiency of as high as possible (e.g., 50 percent or greater) and the expansion element 204 and the output coupler 206 have an efficiency low enough to provide a uniform image across the output coupler 206.

The light can be a single color of light (e.g., a band of wavelengths approximately between 500 and 550 nanometers (nm)) or can be multiple colors (e.g., two or three colors) in some embodiments. Light provided to the substrate waveguide 200 is linearly (e.g., P or S) polarized in some embodiments. Alternatively, other polarization and colors at different wavelengths can be utilized without departing from the scope of the inventive concepts disclosed herein.

With reference to FIG. 4, a waveguide combiner 300 can be used as the waveguide combiner 12 (FIG. 1). The waveguide combiner 300 is similar to the waveguide combiner 200 (FIG. 3) and includes a transparent plastic or glass medium 312. The transparent plastic or glass medium 312 includes an input coupler 302 disposed on a downward extending portion 310, an expansion element 304 and an output coupler 306. The transparent plastic or glass medium 312 is elongated having a larger width than height. In some embodiments, the width is three or more times greater than the height. In some embodiments, the width is between 13 and 12 inches and the height is between 3 and 4 inches without the downward extending portion 310.

The input coupler 302 is disposed below a top surface of the glare shield 30 in some embodiments. The output coupler 306 has an area of 11 inches by 2 inches or more in some embodiments.

In some embodiments, the input coupler 302, the expansion element 304 and the output coupler 306 are diffraction gratings (e.g., surface relief gratings, volume holograms, switchable Bragg gratings (SBG), etc.). In some embodiments, the input coupler 302 is a surface relief grating and the expansion element 304 and the output coupler 306 are volume holograms or SBGs. The output coupler 304 is a gradient output coupling grating that provides excellent image quality and acceptable brightness in some embodiments. The input coupler 302 is implemented as surface relief grating in high refractive index (e.g., n≥1.5) dielectric materials. In some embodiments, the input coupler 302, and the expansion element 304 and the output coupler 306 are comprised of reflective arrays.

In some embodiments, the expansion element 304 is a turning grating, such as a SBG or volume hologram configured to expand the pupil in one direction (e.g., down-to-up or vertically in FIG. 4). The expansion element 304 has a trapezoidal shape and receives light from the input coupler 302 which has a circular shape corresponding to the pupil of the projector 14 (FIG. 1). The input coupler 302 diffracts light toward the expansion element 304 which turns the light toward the output coupler 304. The light travels by total internal reflection from the input coupler 302 to the output coupler 206. The output coupler 304 diffracts the light toward the driver 80 (FIG. 2) and out of the substrate waveguide 300 in some embodiments. The input coupler 302 has a greater efficiency than the output coupler 306 in some embodiments. In some embodiments, the input coupler 302 has an efficiency of as high as possible (e.g., 50 percent or greater) and the expansion element 304 and the output coupler 306 has an efficiency low enough to provide a uniform image across the output coupler 306.

With reference to FIGS. 5 and 6, a waveguide combiner system 400 can be used as the waveguide combiner 12 (FIG. 1). The waveguide combiner system 400 includes a transparent plastic or glass medium 412 and a light pipe 420. The light pipe 420 includes an input coupler 402 and operates as an expansion element. The transparent plastic or glass medium 412 includes an output coupler 406. The light pipe 420 can be a plastic or glass medium. Embodiments of the light pipe 420 are described in U.S. patent application Ser.

No. 14/715,332 filed on May 18, 2015, entitled "A Turning Light Pipe For A Pupil Expansion System And Method," and U.S. patent application Ser. No. 14/814,020 (now U.S. Pat. No. 9,523,852) filed by Brown et al. on Jul. 30, 2015 entitled "MICRO COLLIMATOR SYSTEM AND METHOD FOR A HEAD UP DISPLAY (HUD)" both incorporated herein by reference in its entirety.

The transparent plastic or glass medium 412 is elongated having a larger width than height. In some embodiments, the width is three or more times greater than the height. In some embodiments, the width is between 13 and 12 inches and the height is between 3 and 4 inches. The input coupler 402 and the light pipe 420 are disposed below a top surface of the glare shield 30 in some embodiments. The output coupler 406 has an area of 11 inches by 2 inches in some embodiments.

The waveguide combiner system 400 can be made from one or more fixed glass or plastic plates. The waveguide combiner system 400 can have a variety of shapes including generally rectangular, oval, circular, tear drop-shaped, hexagonal, rectangular with rounded corners, square-shaped, etc. Layers of the transparent plastic or glass medium 412 can be used to provide color or to increase field of view.

In some embodiments, the input coupler 402 and the output coupler 406 are diffraction gratings (e.g., surface relief gratings, volume holograms, switchable Bragg gratings (SBG), etc.). In some embodiments, the input coupler 402 is a surface relief grating and the output coupler 406 is a volume hologram or an SBG. The output coupler 406 is a gradient output coupling grating that provides excellent image quality and acceptable brightness in some embodiments. In some embodiments, the input coupler 402 and the output coupler 406 are comprised of reflective arrays.

In some embodiments, the light pipe 420 is configured to expand the pupil in one direction (e.g., left-to-right or horizontally in FIG. 4). In some embodiments, the light pipe 420 is a waveguide embodied as an elongated rectangular prism with a square or rectangular cross sectional area. Light travels through the light pipe 420 in a corkscrew, spiral, helical, or other fashion where all four sides of the rectangular prismatic shape are struck by light as light travels from a first end to a second end by total internal reflection. In some embodiments, the light pipe 420 includes a gradient reflection coating 422 disposed at an interface between the light pipe 420 and the transparent glass or plastic medium 412. In some embodiments, the light travels by total internal reflection on two or three sides of light pipe 420 and by reflection off the gradient reflection coating 422 on a fourth side. In some embodiments, the light pipe 420 uses a fold or turning grating as opposed to the gradient reflection coating 422 to inject light into the transparent plastic or glass medium 412. In some embodiments, the transparent plastic or glass medium 412 includes an input grating.

In some embodiments, the waveguide combiner system 400 can have an orientation similar to the waveguide combiner 300 with the light pipe 420 extending vertically along a side of the transparent glass or plastic medium 412 as opposed to along the bottom of transparent plastic or glass medium 412 as shown in FIG. 5.

The waveguide combiners 200, 300, and the waveguide combiner system 400 have a larger field of view than the conventional 5 degree field of view for automobile windshield combiners. The projector 14 advantageously has a volume of less than one Liter and provides a vertical 4 degree field view and a horizontal 20 degree field of when used with the waveguide combiners 200 and 300 or the waveguide combiner system 400. The waveguide combiners 200, 300 and the waveguide combiner system 400 can have other fields of view without departing from the scope of the exemplary embodiments. Projector 14 is provided in a relatively compact structure due to the expansion of its pupil by the waveguide combiners 200 and 300 and the waveguide combiner system 400 in some embodiments. Applicants believe that expansion from twenty five times to over eighty times is possible using the waveguide combiners 200, 300, and the waveguide combiner system 400 in some embodiments.

Figure 7:
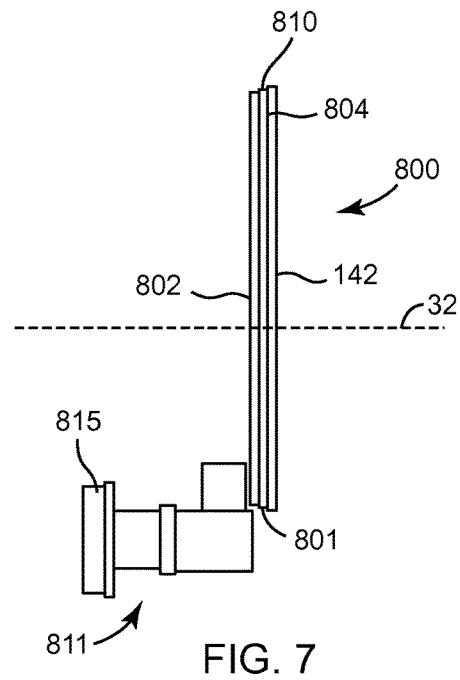
FIG. 7 side view simplified schematic diagram of the HUD system illustrated in FIG. 1 in accordance with some exemplary embodiments of the inventive concepts disclosed herein.
Figure 8:
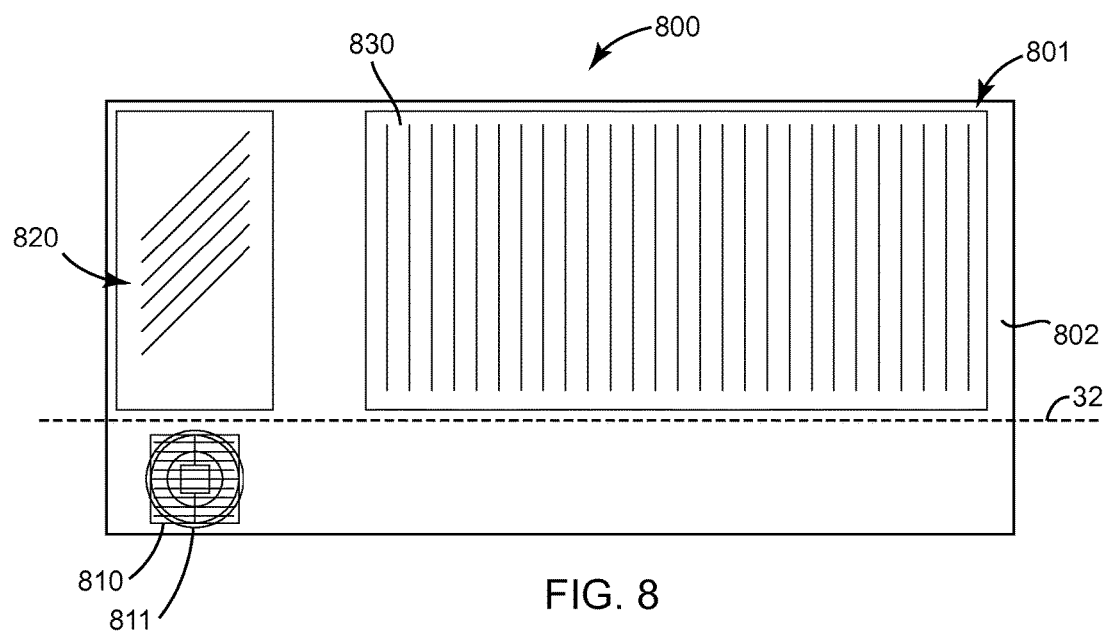
FIG. 8 is a front view schematic drawing of the HUD system illustrated in FIG. 7.

With reference to FIGS. 7 and 8, a HUD 800 includes a stack of waveguide combiners 801. The stack of waveguide combiners 801 provides three separate mediums for providing color or expanding the field of view as described in U.S. patent application Ser. No. 14/497,280 incorporated herein by reference. In some embodiments, a separate color is provided in each of the waveguide combiners 801. Each of the waveguide combiners 801 includes an input coupler 810, an expansion element 820 and an output coupler 830 similar to input coupler 302, expansion element 304 and output coupler 306 in some embodiments. In some embodiments, the input coupler 810, the expansion element 820 and the output coupler 830 are diffraction gratings configured for dual pupil expansion. A projector 811 for HUD 800 includes an image source 815, and is provided below the glareshield 32 in some embodiments. Image source 815 is a micro display in some embodiments.

Figure 9:
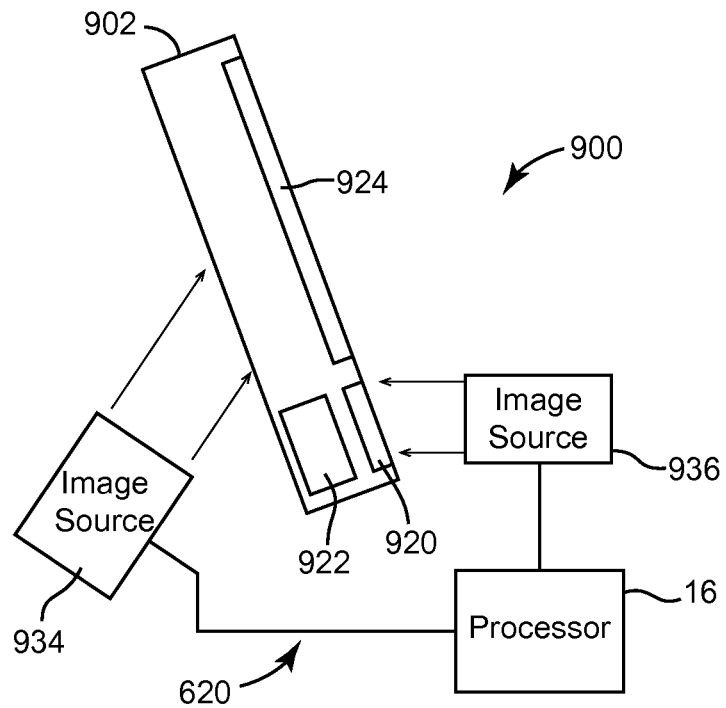
FIG. 9 is a general block diagram of a head up display (HUD) system in accordance with some exemplary embodiments of the inventive concepts disclosed herein.

With reference to FIG. 9, a HUD system 900 is similar to HUD system 10 and includes a waveguide combiner 902 including an input grating 920, an expansion grating 222 and an output coupler 924. The HUD system 900 also includes a projector 930 controlled by the processor 16. The projector 930 includes an image source 934 and an image source 936.

The image source 934 is configured to provide vehicle instrumentation data on the waveguide combiner 902. In some embodiments, the image from the image source 934 is reflected off of a main surface of the waveguide combiner 902 and does not utilize the total internal reflection path associated with the waveguide combiner 902. In some embodiments, the focal distance for the image from the image source 934 is two meters for the instrumentation data or just in front of the end of hood of the automobile. In some embodiments, image source 934 is a laser scanner which directly provides vehicle instrumentation data on a main surface of the waveguide combiner 902. In some embodiments, the laser scanner is provided at a bottom of the waveguide combiner 602 and excites a coating on the waveguide combiner 902 to provide an image representing the vehicle instrumentation data. In some embodiments, the bottom portion of the waveguide combiner 902 is above a flat holographic lens that creates a focal distance for the image vehicle instrumentation data of roughly two meters, or just in front of the hood In some embodiments, the image source 934 is a transparent display directly attached to a main surface of the waveguide combiner 902. In some embodiments, the image source 934 is a transparent organic light emitting diode (OLED) display provided directly on the main surface of the waveguide combiner 902. The image source 934 provides a color image in some embodiments.

The image source 936 provides conformal images. Projector 930 operates similar to projector 14 and provides the conformal image from the image source 936 through the input coupler 920 and the expansion element 922 to the output coupler 924. The projector 930 can provide the conformal images associated with the image source 936 at a focal length greater than the focal length associated with the image provided by the image source 934 and as collimated (e.g., focal length at infinity) or near collimated light in some embodiments. In some embodiments, the image source 936 provides a monochrome image having a different color than the color or colors provided by the image source 934.

In some embodiments, the vehicle instrumentation information (e.g. speed, warning lights, etc.) from the image source 934 (e.g. speed, warning lights, etc.) is provided at the front of the waveguide combiner 902 and images derived from infrared data are provided using the image source 936 in the near infinity range conformally in the environment or as a collimated display. In some embodiment, the image associated with the vehicle instrumentation data is provided off to a side of or below the central viewing area of the waveguide combiner 902 while the conformal image is provided in the central viewing area.

Figure 10:
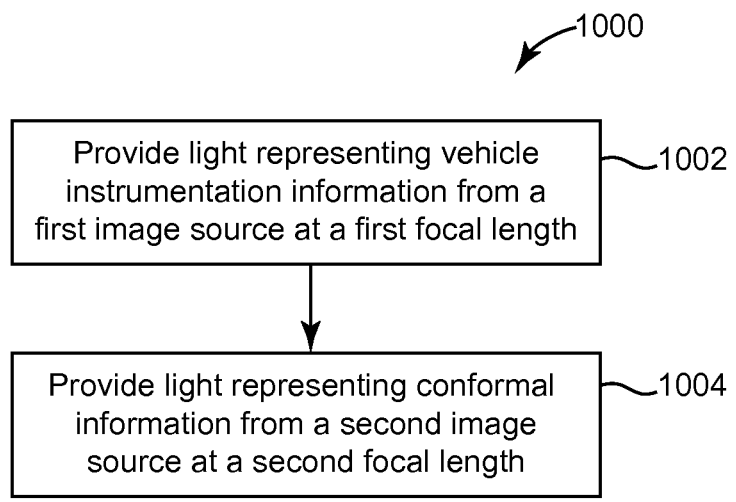
FIG. 10 is a flow showing the provision of information to a driver using the HUD system illustrated in FIG. 9 in accordance with some exemplary embodiments of the inventive concepts disclosed herein.

With reference to FIG. 10, information is provided to a driver using the HUD system 900 allowing to a flow 1000. At an operation 1002, light representing information from vehicle instruments is provided from the image source 934 to the driver at a first focal point. In some embodiments, the information is provided using the waveguide combiner 902.

At an operation 1004, light representing conformal information is provided from the image source 936 to the waveguide combiner 902 at a second focal point further from the driver than the first focal point. Operations 1002 and 1004 can be performed simultaneously in some embodiments.

It is understood that while the detailed drawings, specific examples, material types, thicknesses, dimensions, and particular values given provide a preferred exemplary embodiment of the present invention, the preferred exemplary embodiment is for the purpose of illustration only. The method and apparatus of the invention is not limited to the precise details and conditions disclosed. For example, although specific types of optical component, shapes, dimensions and angles are mentioned, other components, dimensions and angles can be utilized. Various changes may be made to the details disclosed without departing from the spirit of the invention which is defined by the following claim.

What is claimed is:

1. A head up display for use in a vehicle including a glareshield, comprising:
    a waveguide combiner having an input grating, a turning grating and an output grating; and
    a projector configured to provide light to the input grating, the light entering the waveguide combiner through the input grating, wherein a pupil associated with the projector is expanded in a first direction by the turning grating and is expanded in a second direction by the output grating, wherein the projector comprises a first image source for instrumentation information and a second image source for conformal data, wherein a first image from the first image source is projected at a first focal distance and a second image from the second image source is projected at a second focal distance wherein the first focal distance is less than the second focal distance, wherein the first image is a color image and the second image is a monochrome image, wherein the first image source comprises a scanning laser.

2. The head up display of claim 1, wherein the turning grating is disposed horizontally relative to a surface of the glareshield.

3. The head up display of claim 1, wherein the turning grating is disposed vertically relative to a surface of the glareshield.

4. The head up display of claim 1, wherein the turning grating is disposed in a light pipe oriented either horizontally or vertically relative to a surface of the glareshield.

5. The head up display of claim 1, wherein the turning grating is disposed horizontally and the input grating turning grating is disposed below a top surface of the glareshield.

6. The head up display of claim 1, wherein the turning grating is disposed vertically and the input grating is disposed below a top surface of the glareshield and the turning grating is disposed above the glareshield.

7. The head up display of claim 1, wherein the waveguide combiner is generally rectangular and has a bumped out portion, and wherein the input grating is disposed in the bumped out portion.

8. The head up display of claim 1, wherein the turning grating is provided in a trapezoidal area on the substrate combiner.

9. The head up display of claim 1, wherein the turning grating comprises at least one of a volume hologram and a surface relief grating.

10. The head up display of claim 1, wherein the projector is provided below a top surface of the glareshield.

11. A head up display for use in a vehicle for providing information to a driver, the head up display comprising:
    a waveguide combiner having an input grating and an output grating;
    a projector comprising a first image source for instrumentation information and a second image source for conformal data, wherein a first image from the first image source is viewable on the waveguide combiner at a first focal distance and a second image from the second image source is viewable on the waveguide combiner at a second focal distance, wherein the first focal distance is less than the second focal distance.

12. The head up display of claim 11, wherein light representing the conformal data is provided as collimated light.

13. The head up display of claim 11, wherein the second focal point is greater than 100 meters from a driver of the vehicle.

14. The head up display of claim 11, wherein the waveguide combiner further comprises a light pipe having a leaky surface.

15. The head up display of claim 11, wherein the waveguide combiner further comprises a fold grating.

16. The head up display of claim 11, wherein the waveguide combiner further comprises a light pipe having a fold grating.

17. A head up display for use in a vehicle including a glareshield, the head up display comprising:
    a waveguide combiner comprising:
    an elongated transparent medium having a width and a height, the width being substantially greater than the height, the elongated transparent medium having elongated sides extending across the width;
    an output coupler disposed on the elongated transparent medium and configured to expand a first image provided to the elongated transparent medium in a first direction;
    an expansion element configured to expand the first image provided to the elongated transparent medium in a second direction, the second direction being perpendicular to the first direction;
    an input coupler disposed on the elongated transparent medium and below the output coupler; and
    a projector configured to provide light to the waveguide combiner, wherein the projector comprises a first image source for conformal data and a second image source for instrumentation information, wherein the first image is from the first image source and is viewable on the waveguide combiner as a monochrome image and wherein a second image from the second image is viewable on the waveguide combiner and is a color image.

18. The head up display of claim 17, wherein the expansion element is at least one of a fold grating and a light pipe having a leaky surface, and wherein the first direction is parallel to the elongated sides of the elongated transparent medium or wherein the expansion element is disposed below the output coupler, and the first direction is perpendicular to the elongated sides of the elongated transparent medium.

19. The head up display of claim 17, further comprising a projector coupled with the elongated transparent medium, wherein the projector has a volume of less than 1 liter.

20. The head up display of claim 17, wherein the second image source is a laser scanner.

* * * * *